(12) United States Patent
Gebhart et al.

(10) Patent No.: US 7,676,474 B2
(45) Date of Patent: Mar. 9, 2010

(54) SYSTEMS AND METHODS FOR FINDING LOG FILES GENERATED BY A DISTRIBUTED COMPUTER

(75) Inventors: Alexander Gebhart, Bad Schoenborn (DE); Erol Bozak, Pforzheim (DE)

(73) Assignee: SAP AG, Walldorf (DE)

( * ) Notice: Subject to any disclaimer, the term of this patent is extended or adjusted under 35 U.S.C. 154(b) by 243 days.

(21) Appl. No.: 11/313,769

(22) Filed: Dec. 22, 2005

(65) Prior Publication Data
US 2007/0156698 A1 Jul. 5, 2007

(51) Int. Cl.
*G06F 17/30* (2006.01)
(52) U.S. Cl. .............................. 707/10; 707/3; 707/101; 707/104.1
(58) Field of Classification Search ..................... 707/3, 707/8, 10, 101, 102, 104.1
See application file for complete search history.

(56) References Cited

U.S. PATENT DOCUMENTS

| | | | |
|---|---|---|---|
| 6,014,672 A * | 1/2000 | Satoh et al. ................. | 707/102 |
| 6,401,097 B1 | 6/2002 | McCotter et al. | |
| 6,532,121 B1 * | 3/2003 | Rust et al. .................... | 707/101 |
| 6,832,220 B1 | 12/2004 | Rahman | |
| 6,938,116 B2 * | 8/2005 | Kim et al. .................... | 711/103 |
| 7,307,746 B2 * | 12/2007 | Inoue ............................. | 707/3 |
| 2003/0050966 A1 * | 3/2003 | Dutta et al. .................. | 709/203 |
| 2005/0038968 A1 * | 2/2005 | Iwamura et al. ............. | 711/162 |
| 2005/0144469 A1 * | 6/2005 | Saitoh ......................... | 713/189 |
| 2005/0160107 A1 | 7/2005 | Liang | |
| 2005/0165912 A1 | 7/2005 | Colbeck et al. | |
| 2006/0031827 A1 * | 2/2006 | Barfield et al. ............... | 717/168 |
| 2006/0184529 A1 * | 8/2006 | Berg et al. ...................... | 707/8 |
| 2006/0265417 A1 * | 11/2006 | Amato et al. ................ | 707/102 |
| 2008/0005664 A1 * | 1/2008 | Chandra ....................... | 715/513 |
| 2008/0222125 A1 * | 9/2008 | Chowdhury .................... | 707/4 |

OTHER PUBLICATIONS

Satoh, Information retrieval system for electronic filing system includes search unit which searches for document in document preserving unit, based on search condition detected by log search unit, Mar. 6, 1998, Derwent-Week 20010 publication, pp. 1-3.*
Satoh et al, "Information retrieval system for electronic filing system includes search unit which searched for document in document preserving unit, based on search condition detected by log search unit", Jan. 11, 2000, Derwent-Week, 200010, pp. 1-2.*

* cited by examiner

*Primary Examiner*—Shahid A Alam
*Assistant Examiner*—Rezwanul Mahmood
(74) *Attorney, Agent, or Firm*—Mintz, Levin, Cohn, Ferris, Glovsky & Popeo, P.C.

(57) ABSTRACT

Systems and methods are provided for finding a log file generated by an application during an execution of the application on at least one computer node. The computer node is one of a plurality of computer nodes of a distributed computer that has a computer-readable storage medium that contains therein both a plurality of log files and meta data describing attributes of the log files. In one implementation, a method includes receiving at least one attribute describing a log file that has been generated by the computer node of the distributed computer. The meta data is searched to identify one or more log files described by the received attribute. Locations of the identified log files in the computer-readable storage medium are presented based on the results of the searching step.

17 Claims, 5 Drawing Sheets

SYSTEMS AND METHODS FOR FINDING LOG FILES GENERATED BY A DISTRIBUTED COMPUTER

BACKGROUND

I. Technical Field

The present invention relates generally to finding log files generated by computer nodes of a distributed computer system.

II. Background Information

Computers commonly use log files to record details of executions of processing tasks, such as software applications. For example, as a computer executes a software application, the computer may record preselected details of the execution process, such as errors, in a log file. The log file can later be analyzed to review the execution process. For example, a human operator can review the log file to identify errors in the execution process and debug the software application.

Grid computing is a form of computing that distributes computer resources, such as computational resources and data storage resources, among multiple computer nodes to execute coherent processing tasks, such as software applications. These resources are managed to improve efficiency and permit the execution of resource-intensive tasks that may otherwise be impractical. For example, an application can be divided into components that are deployed to multiple respective computer nodes to prevent bottlenecking of resources at any particular computer node.

In one conventional mode of grid computing, each of the computer nodes independently generates and stores log files relevant to the application components that are executed on that computer node. For example, each of the computer nodes may generate at least one separate log file per execution of an application component. However, accessing the log files may be slow and difficult because the log files are stored at the separate locations of the computer nodes.

To improve accessibility, the log files can be stored in a centralized data storage location. In this way, the multiple computer nodes do not have to be separately accessed and searched to find recorded details of the distributed processing of an application across the multiple computer nodes. Rather, the centralized data storage location is accessed to find and analyze the processing details recorded therein. For example, if an error occurs in the distributed processing of the application, one or more of the log files in the central data storage location can be analyzed to determine the problem that caused the error.

However, grid computing can generate a large number of log files in the central data storage location. It may be time-consuming and inconvenient to identify relevant log files among a large number of irrelevant log files. Moreover, it can be difficult to present the locations of all of the relevant log files to a human operator in a user-friendly manner.

Thus, it is desirable to more efficiently identify relevant log files generated during grid computing in a computer-readable storage medium. It is further desirable to visually display the locations of the identified log files in the computer-readable storage medium to a human operator.

SUMMARY

Consistent with embodiments of the invention, systems and methods are provided for finding a log file generated by an application during an execution of the application on at least one computer node. Embodiments of the invention include systems and methods, as well as computer program products comprising computer-readable program code that performs methods consistent with the invention when implemented by a computer or processor.

A method is provided of finding a log file generated by an application during an execution of the application on at least one computer node. The computer node is one of a plurality of computer nodes of a distributed computer that has a computer-readable storage medium that contains therein both a plurality of log files and meta data describing attributes of the log files. The method comprises receiving at least one attribute describing a log file that has been generated by the computer node of the distributed computer. The meta data are searched to identify one or more log files described by the received attribute. Locations of the identified log files in the computer-readable storage medium are presented based on the results of the searching step.

A system is provided for finding a log file generated by an application during an execution of the application on at least one computer node. The system comprises an input device to receive at least one attribute describing a log file that has been generated by the computer node of the distributed computer. A log searcher is provided to search the meta data to identify one or more log files described by the received attribute. The system further comprises an output device to present, based on the results of the log searcher, locations of the identified log files in the computer-readable storage medium.

A computer program product is provided for finding a log file generated by an application during an execution of the application on at least one computer node. The computer node is one of a plurality of computer nodes of a distributed computer. The distributed computer has a computer-readable storage medium that contains therein both a plurality of log files and meta data describing attributes of the log files. The computer program product comprises a computer-readable storage medium having computer-readable program code stored therein. The computer-readable program code is executable by a processor and comprises an input instruction set executable to receive, from an operator, at least one attribute describing a log file that has been generated by the computer node of the distributed computer. A log searching instruction set is provided that is executable to search the meta data to identify one or more log files described by the received attribute. The computer-readable program code further comprises an output instruction set executable to present, based on the results of executing the log searching instruction set, locations of the identified log files in the computer-readable storage medium.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments consistent with the present invention may be directed to various combinations and sub-combinations of the features described in the following detailed description.

BRIEF DESCRIPTION OF THE DRAWINGS

The accompanying drawings, which are incorporated in and constitute a part of this specification, illustrate embodiments of the invention and, together with the description, serve to explain the principles of the invention. In the drawings.

DESCRIPTION OF THE EMBODIMENTS

Figure 1:
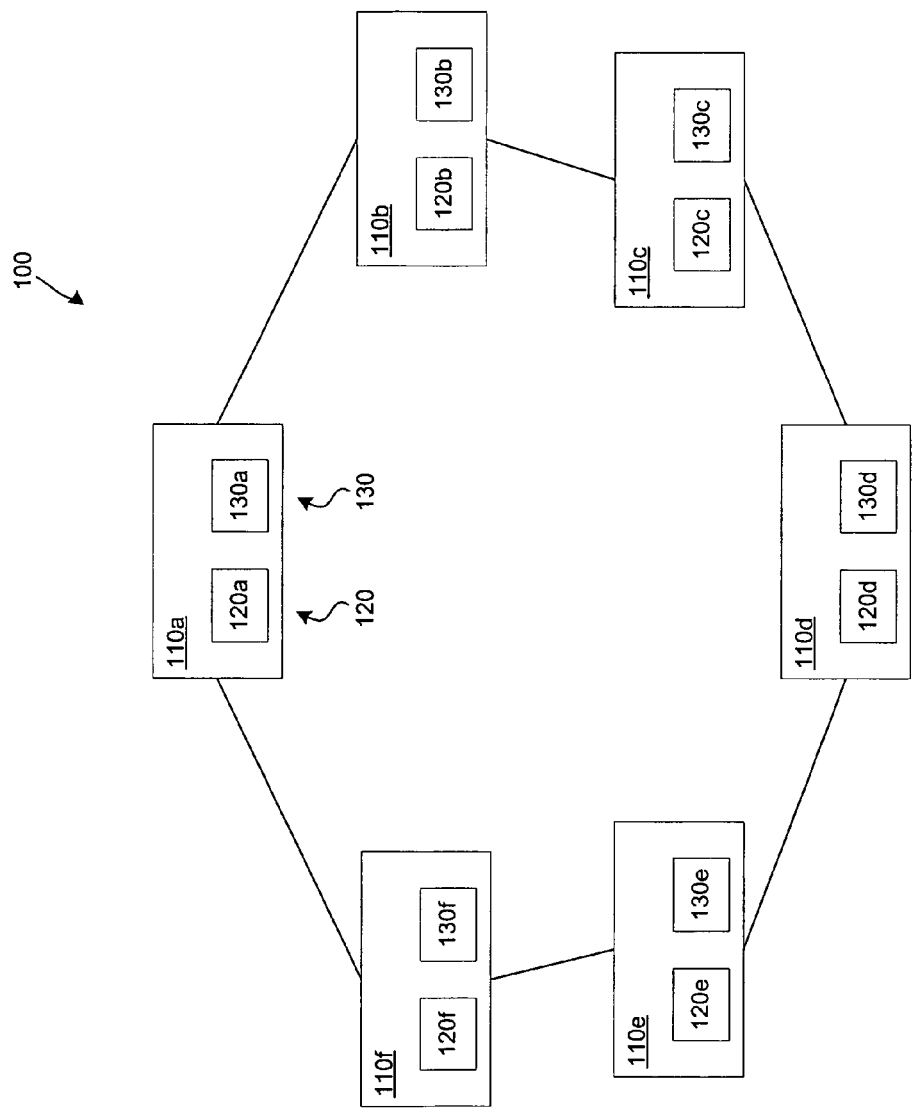
FIG. 1 is a block diagram of an exemplary embodiment, consistent with the present invention, of a distributed computer system having a plurality of computer nodes.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

A distributed computer system 100 includes a plurality of computer nodes 110a-110f, as in the exemplary embodiment illustrated in the block diagram of FIG. 1. The individual computer nodes 110a-110f may be implemented as a personal computer (PC), such as a server, that has its own microprocessor 120a-120f and computer-readable storage medium 130a-130f. These computer nodes 110a-110f are coupled to one another to enable communication among the computer nodes 110a-110f, such as in a local area network (LAN). For example, in one embodiment the computer nodes 110a-110f are mutually coupled as a LAN across an ethernet connection, although any network, such as an internet or the Internet, or a dedicated connection can be used.

When an application is executed by the distributed computer system 100, the distributed computer system 100 distributes execution of the application across one or more of the computer nodes 110a-110f and manages the overall execution of the application among the multiple computer nodes 110a-110f. For example, one of the computer nodes 110a-110f of the distributed computer system 100 manages the allocation of local computational resources, such as processing cycles on one or more of microprocessors 120a-120f, to the application. One of the computer nodes 110a-110f also manages the allocation of data storage resources, such as one or more computer-readable storage media 130a-130f, to the application. Local computational and/or data storage resources at the computer nodes 110a-110f are thus allocated to the application. The distributed computer system 100 pools the computational and/or data storage resources of the computer nodes 110a-110f to emulate a single computer and thereby efficiently undertake the execution of the application. This process of distributing resources across the multiple computer nodes 110a-110f may be referred to as "grid computing." In one embodiment, the distributed computer system 100 includes a plurality of computer nodes 110a-110f operating on an SAP Netweaver™ software platform, commercially available from SAP AG, Walldorf, Germany.

As one of the computer nodes 110a-110f executes the application, the computer node 110a-110f may generate a log file containing details of this execution event. The log file may be centrally stored in a computer-readable storage medium 130 of the distributed computer system 100. For example, the computer-readable storage medium 130 may be implemented using one or more of magnetic, solid state, and optical memory. The centralized storage of the multiple log files within the computer-readable storage medium 130 creates a centralized record of the distributed execution of applications on the distributed computer system 100. This centralized record can be accessed without permanently occupying the separate memory resources, such as the computer-readable storage media 130a-130f, of the individual computer nodes 110a-110f or having to individually access the memory resources of the computer nodes 110a-110f. However, it is also desirable to efficiently search the multiple log files according to one or more attributes to locate a particular log file that is useful for a particular purpose.

When an application ends at one of the computer nodes 110a-110f, the local data storage of that computer node 110a-110f may be purged of substantially all data associated with that application to free the data storage resources at that computer node 110a-110f for future use. However, the log file remains in the computer-readable storage medium 130 after the execution of the application ends at the computer node 110a-110f that generated that particular log file.

Attributes of an execution of an application that resulted in the log files are stored in the computer-readable medium 130 as meta data. The attributes may describe an aspect of the execution, and the meta data can be used to map the attribute to the locations of the log files that were generated by the execution. For example, the attributes stored in the meta data may include one or more of the following: (i) a global unique identifier (GUID) that uniquely identifies the execution of a particular application on the distributed computer system 100, including any components of the application that are executed on different computer nodes 110a-110f, (ii) an internet protocol (IP) address of the computer node 110a-110f that executed the application, (iii) a hostname of the computer node 110a-110f that executed the application, (iv) a message that has been transmitted to or from the computer node 110a-110f, (v) log files of potential wrapper services, (vi) an application family identifier, (vii) an application version or application release identifier, and (viii) a date of the execution of the application on the computer node 110a-110f.

Figure 2:
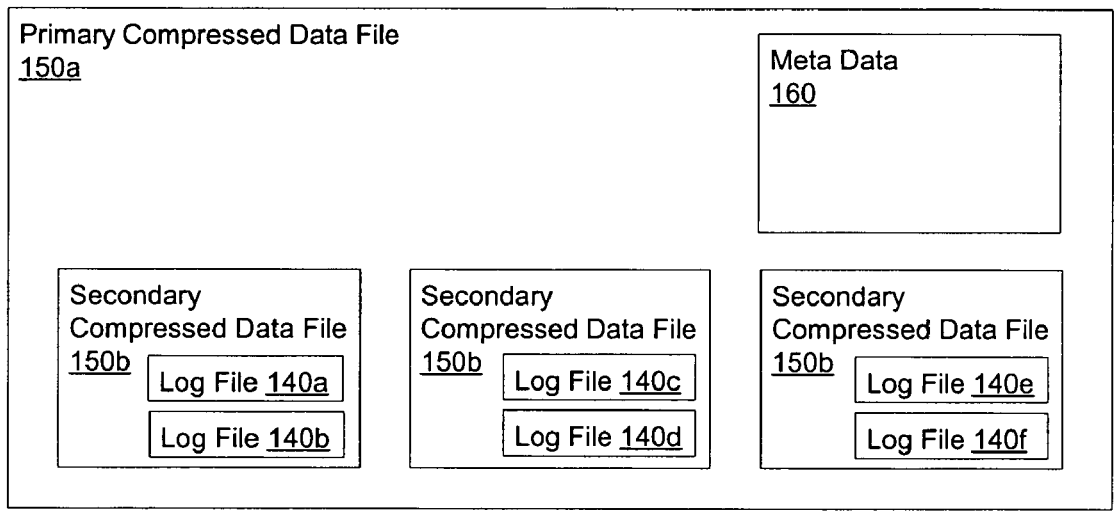
FIG. 2 is a block diagram of an exemplary embodiment, consistent with the present invention, of a primary compressed data file containing meta data and secondary compressed data files, the secondary compressed data files containing log files.

FIG. 2 is a schematic diagram of an exemplary embodiment of a plurality of log files 140a-140f in the computer-readable storage medium 130 of FIG. 1. The log files 140a-140f may be contained in one or more compressed data files 150a, 150b, such as files compressed using a lossless data compression algorithm. For example, the compressed data files 150a, 150b may be formatted as ZIP files. Alternatively, the compressed data files 150a, 150b may be compressed according to one or more of Lempel-Ziv-Markov chain algorithm (LZMA) or a Lempel-Ziv-Welch (LZW) algorithm. Although the above description refers to the log files 140a-140f being compressed, the log files 140a-140f may alternatively be stored without compression.

The log files 140a-140f may additionally or alternatively be contained in a plurality of nested data files, such as the nested and compressed data files 150a, 150b shown in FIG. 2. This nested data structure allows log files contained within one layer of the nested data files, such as the log files encompassed by nested and compressed data file 150*a*, or the log files encompassed by nested and compressed data file 150*b*, to share a common attribute. This nesting of the log files 140*a*-140*f* by attribute can improve the efficiency of searching through the log files 140*a*-140*f* to find one or more relevant log files.

For example, in the embodiment shown in FIG. 2, a primary compressed data file 150*a* contains a plurality of secondary compressed data files 150*b* nested therein. Each of the secondary compressed data files 150*b* contains a plurality of the log files 140*a*-140*f*. The log files contained within an individual secondary compressed data file 150*b* may be all of the log files associated with the execution of all components of a particular application on a particular one of the computer nodes 110*a*-110*f*, such as computer node 110*a*. The meta data 160 is contained at the layer of the secondary compressed data files 150*b*. The log files 140*a*-140*f* may be contained in nested, compressed data files that are deeper than two layers, and the meta data 160 may be contained at any of those layers. However, it may be desirable to contain the meta data 160 at the layer of the secondary compressed data file 150*b* (as shown) or the layer of the primary compressed data file 150*a* (not shown) to improve efficient accessibility of the meta data 160 absent decompression of compressed data files at even deeper layers.

Figure 3:
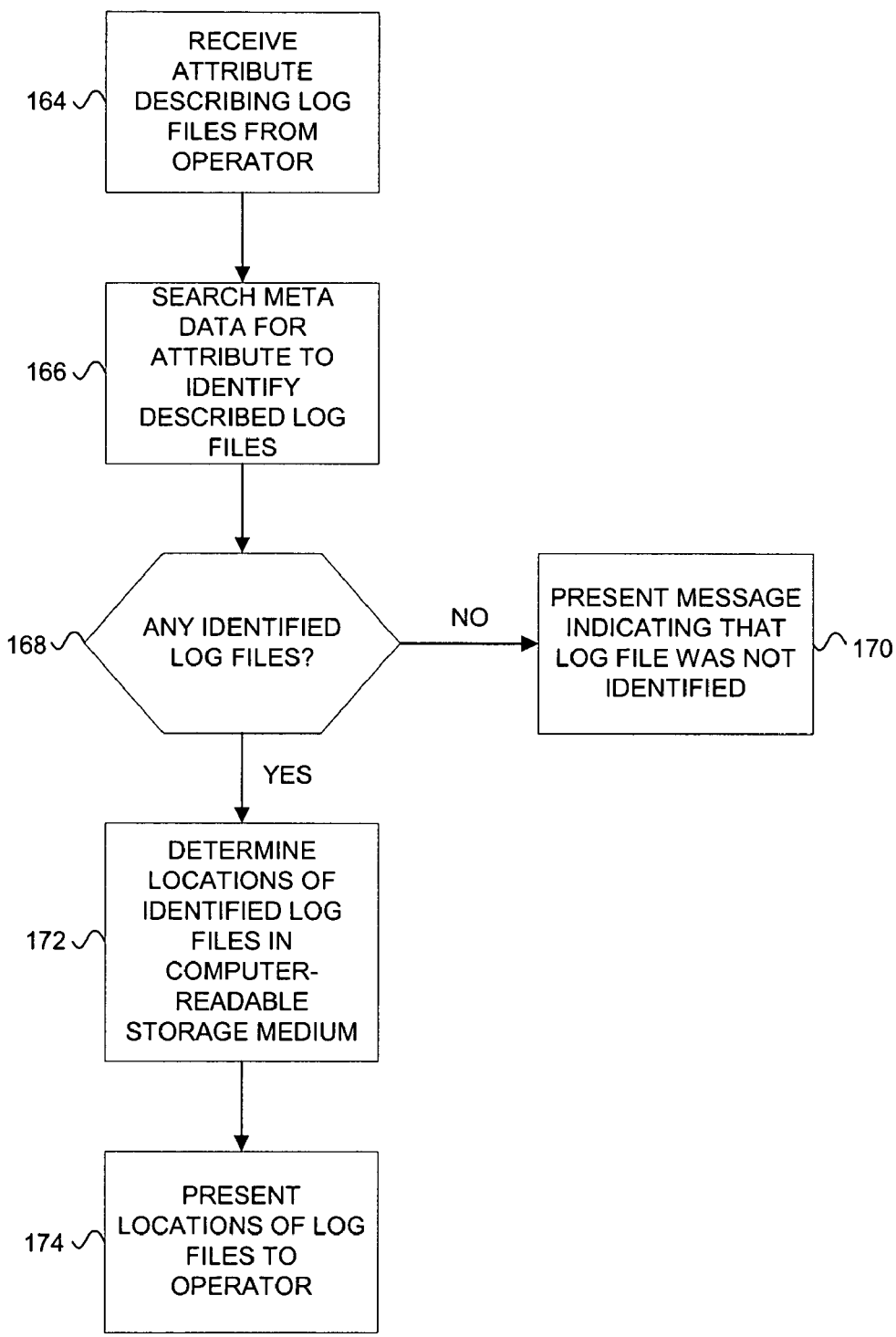
FIG. 3 is a flowchart of an exemplary embodiment, consistent with the present invention, of a process of finding log files that match a received attribute.

A method is provided of finding a log file generated by one of the applications during an execution of the application on one of the computer nodes 110*a*-110*f* shown in FIG. 1. FIG. 3 is a flowchart of an exemplary embodiment of the method by which the log files 140*a*-140*f* in the computer-readable storage medium 130 are identified as matching an attribute. At least one attribute describing a log file 140*a*-140*f* is received from an operator, as shown by step 164. The operator is an entity that requests the search for the log file and receives the results of the search. For example, the operator may be a human operator, such as an administrator, developer, or a member of support personnel. Alternatively, the operator may be another computer, such as one of the computer nodes 110*a*-110*f*. The meta data 160 stored at computer-readable storage medium 130 are then searched to identify one or more log files 140*a*-140*f* described by the received attribute, as shown by step 166. For example, the GUID "xyz" may be received as an attribute from an operator. The meta data 160 are searched for the GUID "xyz" to locate log files described by the GUID "xyz," namely log files that were generated by the particular instance of the distributed execution of the particular application referred to by the GUID "xyz" on the distributed computer 100 of FIG. 1.

If a log file described by the attribute is not identified, as shown by conditional branch 168, a message is presented indicating that a log file was not identified, as shown by step 170. For example, for the received attribute GUID "xyz," there may not exist a log file that is described by the GUID "xyz." However, if one or more of the log files are identified at step 166, as shown by conditional branch 168, the locations of the identified log files in the computer-readable storage medium 130 are determined, as shown by step 172. Determining the locations of the log files refers to determining memory addresses of the log files that uniquely identify the individual log files within the computer-readable storage medium 130. The memory address can be used by the distributed computer system 100 to access and read that particular log file. The address of the log file may include a filename and directory structure associated with the log file. For example, if the meta data 160 maps the GUID "xyz" to an existing log file, the meta data 160 may be read to determine which compressed data file 150*b* contains the log file and the filename of the log file. The locations of the log files are presented to the operator, as shown by step 174. The operator can use the locations of the log files to access the log files. For example, the operator can use a text editor or other text reader to read the identified log files.

Figure 4:
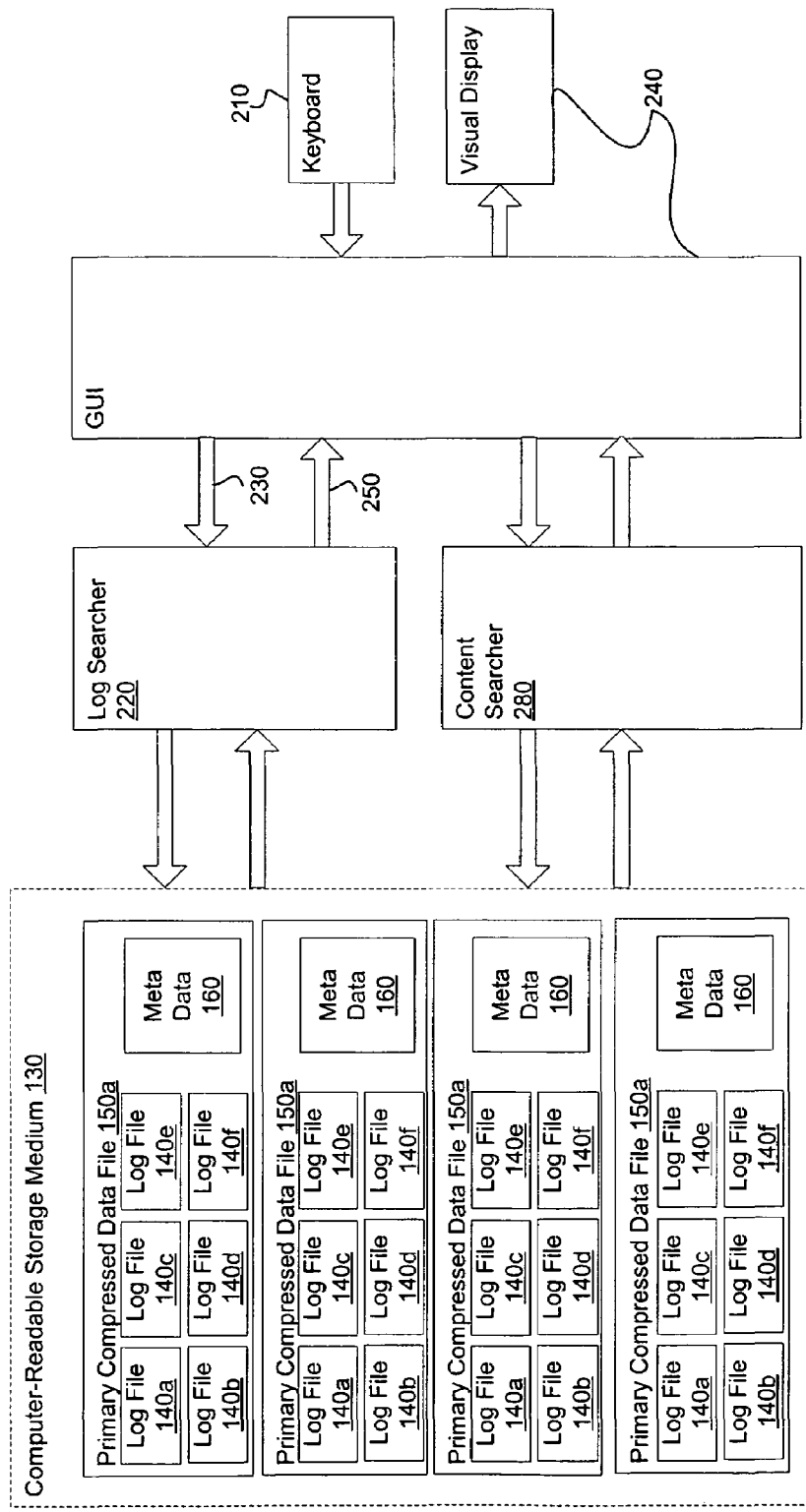
FIG. 4 is a block diagram of an exemplary embodiment, consistent with the present invention, of a system having an input device, a log searcher, and an output device.

A system may be provided for finding log files based on the attributes. FIG. 4 is a block diagram of a system 195 for finding a log file generated by an application during an execution of the application on at least one of the computer nodes 110*a*-110*f* shown in FIG. 1. The system 195 may include an input device 210 to receive, from the operator, at least one attribute describing log files that have been generated by the computer nodes 110*a*-110*f* of the distributed computer system 100. If the operator is a human operator, the input device 210 provided for the human operator may include a keyboard (as shown), mouse, and/or touch-sensitive screen.

The system 200 further includes a log searcher 220 to receive the attribute from the input device 210 and search the meta data 160 to identify one or more log files described by the received attribute. One or more messages 230, at least one of which contains the attribute, pass from the operator to the log searcher 220 through the input device 210. In one embodiment, these messages 230 include messages of a SOAP format. Several examples of SOAP messages comprising search requests are shown in Tables 1-3, provided below for the sake of illustration. The corresponding attributes and attribute types being searched for are shown below each of the SOAP search request messages. Table 1 is a request to find log files having the attribute that GUID is "xyz". Table 2 is a request to find log files having the attribute that GUID is "abc" and the attribute that the IP Address of the computing node that generated the log files is "192.168.0.30". Table 3 is a request to find log files having the attribute that IP Address of the computing node that generated the log files is "192.168.0.30," and the attribute that the date on which the log file was generated is more recent than Aug. 10, 2004.

TABLE 1

| SOAP Message | |
| --- | --- |
| "select * from archive where GUID=xyz" | |
| Attribute Type(s) | Attribute(s) |
| GUID | "xyz" |

TABLE 2

| SOAP Message | |
| --- | --- |
| "select * from archive where GUID=abc AND IP-Address=192.168.0.30" | |
| Attribute Type(s) | Attribute(s) |
| GUID, IP Address | "abc", 192.168.0.30 |

TABLE 3

| SOAP Message | |
| --- | --- |
| "select * from archive where IP-Address=192.168.0.30 AND Date>2004-08-10" | |
| Attribute Type(s) | Attribute(s) |
| IP Address, Date | 192.168.0.30, >2004-08-10 |

The system 200 further includes an output device 240 to present, to the operator, the locations, in the computer-readable storage medium 130, of the log files identified by the log searcher 220. One or more messages 250, which include the locations of the identified log files, pass from the log searcher 220 to the operator through the output device 240. These messages 250 may be implemented as messages formatted in accordance with SOAP.

The output device 240 may be implemented to provide a visual display driven by a graphical user interface GUI (as shown) to visually present the locations, such as a filename and/or directory structure, of the identified log files on the visual display, such as when the operator is a human operator. The visual display may include, for example, a liquid crystal display (LCD) monitor, a cathode ray tube (CRT) monitor, a plasma monitor, or another suitable visually-readable monitor. Alternatively, the output device 240 may include interface circuitry, such as to present the locations of the log files to another computer. The log searcher 220 passes the location information as messages 250 to the GUI, which commands the visual display of the output device 240 to display the locations of the log files.

When the identified log files are presented on the visual display of the output device 240, the identified log files can be displayed in a hierarchical structure corresponding to layers of nested data files containing the log files. For example, the hierarchical structure may be visually presented by the GUI as a tree structure with branches corresponding to incrementally deeper layers of the nested data files containing the log files as described above in reference to FIG. 2. Additionally, the hierarchical structure shown on the visual display may be interactively expandable and collapsible at each hierarchical layer to improve the visual presentation.

The system 200 may further include a content searcher 280 to search the contents of the log files 140a-140f, such as the log files that were identified in step 166 of FIG. 3. The content searcher 280 may be adapted to do a full-text search of the log files 140a-140f for at least one preselected keyword. The content searcher 280 may present the log files containing the keyword to the operator via the output device 240. Optionally, the content searcher 280 may also present the locations of the keyword within each of the log files. The content searcher 280 may, for example, present its results to the GUI, which displays the results on the visual display of the output device 240.

Figure 5:
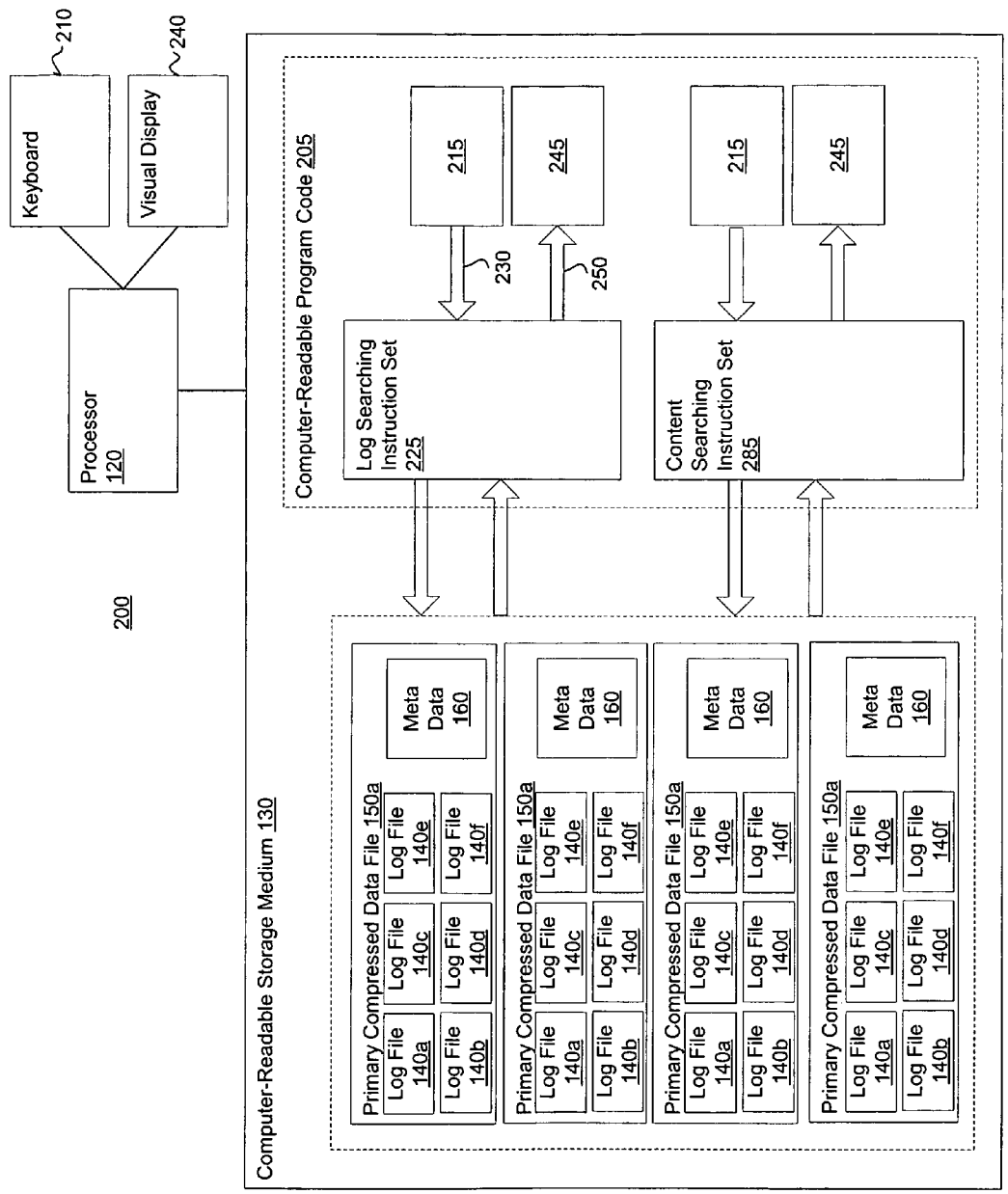
FIG. 5 is a block diagram of an exemplary embodiment, consistent with the present invention, of a system implemented with a computer that includes a computer-readable storage medium having computer-readable program code stored therein and a processor to execute the computer-readable program code.

The system 195 of FIG. 4 may be implemented with one or more computers, such as the computer 200 illustrated in the block diagram of FIG. 5. For example, the computer may include a server, workstation, or laptop. The computer 200 includes the computer-readable storage medium 130 that stores the log files 140a-140f and computer-readable program code 205. For example, the computer-readable storage medium 130 may be the computer-readable storage medium 130a-130f of one or more of the computer nodes 110a-110f shown in FIG. 1. The computer-readable storage medium 130 may also be specially designed and constructed for the purposes of storing the computer-readable program code 205. The computer-readable program code 205 includes executable instruction sets that are stored on the computer-readable storage medium 130 to form a computer program product. Examples of computer-readable program code include machine code, such as produced by a compiler, and files containing a high level code that can be executed by a processor using an interpreter.

The computer 200 further includes a processor 120 coupled to the computer-readable storage medium 130 to execute the computer-readable program code 205 to perform the functions of the system 195 of FIG. 4 as described herein, such as to search the computer-readable storage medium 130 for log files matching a received attribute. The processor 120 may be the microprocessor 120a-120f of one of the computer nodes 110a-110f shown in FIG. 1. For example, the computer 200 as a whole may be implemented as one or more of the computer nodes 110a-110f shown in FIG. 1, such that the computer-readable storage medium 130 is the computer-readable storage medium 130a-130f of one or more of the computer nodes 110a-110f and the processor 120 is the microprocessor 120a-120f of the same computer nodes.

Alternatively, the computer-readable storage medium 130 and the processor 120 provided to search the computer-readable storage medium 130 for log files may reside elsewhere in the distributed computer system 100, physically separate from the computer nodes 110a-110f. For example, the computer-readable storage medium 130 and the processor 120 may be part of a dedicated server that is provided for the task of centralized storage, finding, and accessing of the log files 140a-140f.

The computer-readable program code 205 may further include an input instruction set 215 executable to receive, from the operator, an attribute describing a log file to be found. The input instruction set 215 is executable to receive, from the operator, at least one attribute describing a log file that has been generated by the computer node 110a-110f of the distributed computer system 100. For example, the computer-readable program code 205 may include software to query a human operator for an attribute, and store the attribute as a variable in a random access memory (RAM) of the computer 200. In one embodiment, the input instruction set 215 is implemented with GUI software. However, if the operator is another computer, such as one of the computer nodes 110a-110f, the input device 210 may correspondingly include interface circuitry to interface between the system 200 and the other computer.

The log searcher 220 of FIG. 4 may be implemented with a log searching instruction set 225, as shown in FIG. 5, executable to search the meta data 160 to identify one or more log files described by the received attribute. The computer-readable program code 205 may further include an output instruction set 245 executable to present, to the operator, the locations of the identified log files in the computer-readable storage medium 130. For example, if the operator is a human operator, the input instruction set 215 and the output instruction set 245 may be implemented together with GUI software to provide an interactive and graphically-based interface for the human operator. Furthermore, the content searcher 280 of FIG. 4 may be implemented with a content searching instruction set 285, as shown in FIG. 5, executable to search the contents of the log files 140a-140f as described above.

Thus, the methods and systems described herein can more efficiently identify relevant log files generated during grid computing and stored in a computer-readable storage medium. The locations of the identified log files in the computer-readable storage medium can also be efficiently presented to an operator. For example, a hierarchical structure representative of the locations of the identified log files can be presented in a user-friendly manner to a human operator.

The foregoing description of possible implementations consistent with the present invention does not represent a comprehensive list of all such implementations or all variations of the implementations described. The description of only some implementations should not be construed as an intent to exclude other implementations.

The methods and systems disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus to perform the required methods and techniques.

What is claimed is:

1. A method comprising:
   receiving at least one attribute describing a log file that has been generated by an application during an execution of the application on at least one computer node, the log file representing a record of execution of the application, the computer node being one of a plurality of computer nodes of a distributed computer, the distributed computer having a computer-readable storage medium including a plurality of log files and meta data describing attributes of the log files, the distributed computer pools the resources of the plurality of computer nodes to emulate a single computer, the resources comprising computational resources and data storage resources;
   searching, by a log searcher, the meta data to identify one or more log files described by the received at least one attribute, the log searcher separate from a content searcher for searching content of the plurality of log files rather than the meta data, the attributes including one or more of the following: a unique identifier, an Internet Protocol address of the at least one computer node that executed the application, a host name of the at least one computer node that executed the application, a message associated with the at least one computer node that executed the application, an application family identifier, and a date of the execution by the at least one computer node; and
   presenting, based on the results of the searching step, locations of the identified log files in the computer-readable storage medium, the locations determined using memory addresses, each of which identifies the location in the computer-readable medium;
   wherein searching the meta data comprises at least partially decompressing a compressed data file containing the meta data, the compressed data file being associated with execution of one or more applications on the distributed computer.

2. The method according to claim 1, wherein presenting the locations of the identified log files in the computer-readable storage medium comprises displaying the locations of the identified log files on a visual display.

3. The method according to claim 2, wherein displaying the locations of the log files comprises displaying names of the identified log files as a hierarchical structure on the visual display, the hierarchical structure representing the locations of the identified log files.

4. The method according to claim 2, further comprising displaying the received attribute on the visual display.

5. The method according to claim 1, wherein searching the meta data comprises at least partially decompressing a compressed data file containing the meta data.

6. The method according to claim 1, wherein receiving the attribute comprises receiving a global unique identifier that is uniquely mapped to the execution of the application on the distributed computer.

7. The method according to claim 1, wherein receiving the attribute comprises receiving an Internet Protocol address of the computer node that executed the application.

8. A system comprising:
   an input device to receive at least one attribute describing a log file that has been generated by an application during an execution of the application on at least one computer node, the computer node being one of a plurality of computer nodes of a distributed computer, the distributed computer having a computer-readable storage medium including a plurality of log files and meta data describing attributes of the log files, the distributed computer pools the resources of the plurality of computer nodes to emulate a single computer, the resources comprising computational resources and data storage resources;
   a log searcher to search the meta data to identify one or more log files described by the received at least one attribute, the log searcher being separate from a content searcher for searching content of the plurality of log files rather than the meta data, the attributes including one or more of the following: a unique identifier, an Internet Protocol address of the at least one computer node that executed the application, a host name of the at least one computer node that executed the application, a message associated with the at least one computer node that executed the application, an application family identifier, and a date of the execution by the at least one computer node; and
   an output device to present, based on the results of the log searcher, locations of the identified log files in the computer-readable storage medium, the locations determined using memory addresses, each of which identifies the location in the computer-readable medium;
   wherein the log searcher is configured to at least partially decompress a compressed data file containing the meta data, the compressed data file being associated with execution of one or more applications on the distributed computer.

9. The system according to claim 8, wherein the output device comprises a graphical user interface to display names of the identified log files as a hierarchical structure on a visual display, the hierarchical structure representing the locations of the identified log files.

10. The system according to claim 9, wherein the graphical user interface is configured to display the received attribute on the visual display.

11. The system according to claim 8, wherein the attribute comprises a global unique identifier that is uniquely mapped to the execution of the application on the distributed computer.

12. The system according to claim 8, wherein the attribute comprises an Internet Protocol address of the computer node that executed the application.

13. The system according to claim 8, wherein the log searcher is configured to at least partially decompress a compressed data file containing the meta data, the compressed data file being associated with an execution of an application on the distributed computer.

14. A computer program product comprising a computer-readable storage medium having computer-readable program code stored therein, the computer-readable program code being executable by a processor and comprising:

an input instruction set executable to receive at least one attribute describing a log file that has been generated by an application during an execution of the application on at least one computer node, the computer node being one of a plurality of computer nodes of a distributed computer, the distributed computer having a computer-readable storage medium including a plurality of log files and meta data describing attributes of the log files, the distributed computer pools the resources of the plurality of computer nodes to emulate a single computer, the resources comprising computational resources and data storage resources;

a log searching instruction set executable to search the meta data to identify one or more log files described by the received at least one attribute, the log searching instruction set separate from a content searcher instruction set for searching content of the plurality of log files rather than the meta data, the attributes including one or more of the following: a unique identifier, an Internet Protocol address of the at least one computer node that executed the application, a host name of the at least one computer node that executed the application, a message associated with the at least one computer node that executed the application, an application family identifier, and a date of the execution by the at least one computer node; and an output instruction set executable to present, based on the results of executing the log searching instruction set, locations of the identified log files in the computer-readable storage medium, the locations determined using memory addresses, each of which identifies the location in the computer-readable medium;

wherein the log searching instruction set is further executable to at least partially decompress a compressed data file containing the meta data, the compressed data file being associated with execution of one or more applications on the distributed computer.

15. The computer program product according to claim 14, wherein the output instruction set comprises graphical user interface software to display names of the identified log files as a hierarchical structure on a visual display, the hierarchical structure representing the locations of the identified log files.

16. The computer program product according to claim 15, wherein the graphical user interface software is configured to display the received attribute on the visual display.

17. A system comprising:

means for receiving at least one attribute describing a log file that has been generated by an application during an execution of the application on at least one computer node, the computer node being one of a plurality of computer nodes of a distributed computer, the distributed computer having a computer-readable storage medium including a plurality of log files and meta data describing attributes of the log files, the distributed computer pools the resources of the plurality of computer nodes to emulate a single computer, the resources comprising computational resources and data storage resources;

means for searching the meta data to identify one or more log files described by the received at least one attribute, the means for searching implemented as a log searcher separate from a content searcher for searching content of the plurality of log files rather than the meta data, the attributes including one or more of the following: a unique identifier, an Internet Protocol address of the at least one computer node that executed the application, a host name of the at least one computer node that executed the application, a message associated with the at least one computer node that executed the application, an application family identifier, and a date of the execution by the at least one computer node;

means for presenting, based on the results of the log searcher, locations of the identified log files in the computer-readable storage medium, the locations determined using memory addresses, each of which identifies the location in the computer-readable medium;

wherein the means for searching the meta data is further configured to at least partially decompress a compressed data file containing the meta data, the compressed data file being associated with execution of one or more applications on the distributed computer.

* * * * *